April 5, 1966  W. B. JAMISON  3,244,235

AIR FLOW CONTROL APPARATUS

Filed May 27, 1964

INVENTOR.
WILL B. JAMISON
BY
ATTORNEY

United States Patent Office 3,244,235
Patented Apr. 5, 1966

3,244,235
AIR FLOW CONTROL APPARATUS
Will B. Jamison, Greensburg, Pa., assignor, by mesne assignments, to Specialties Development Corporation, Belleville, N.J., a corporation of New Jersey
Filed May 27, 1964, Ser. No. 370,530
6 Claims. (Cl. 169—2)

This invention relates to air flow control apparatus, and more particularly to apparatus for maintaining the flow of air through a duct substantially constant and at a predetermined flow rate.

Although not limited thereto, the present air flow control apparatus is particularly adapted for use with fire-fighting apparatus of the type which employs air, flowing at a predetermined flow rate, for the generation of a high-expansion foam. Apparatus of this type is disclosed in my British Patent No. 908,741, issued on October 24, 1962 and entitled, "Improvements in Fire-Fighting and Apparatus Therefor."

In fire-fighting apparatus of this type, a propeller-type fan may be employed for forcing air through a main duct. An apertured member normally formed from a wettable material is positioned within the duct in the path of the flowing air. A foam producing solution is sprayed onto the apertured member so as to wet it. The air contacts the solution and produces a foam whose expansion ratio is normally about 1000 to 1. Extending from the main duct to a convenient point of entry, for example, into a building which is on fire, is a second duct which carries the foam to the building. It should be evident then, that the pressure of the air required depends not only on that pressure required to generate the foam but also on that pressure required to move the generated foam through the duct and into the building. Hence, a certain amount of resistance is inherent in the foam generating apparatus which hinders the flow of the air through the apparatus. For maximum effectiveness, the fan must generate foam at a predetermined constant rate. Thus, the fan must cause air to flow through the apparatus at a predetermined flow rate and at a constant flow rate.

When this type of apparatus is employed to extinguish a large fire, for example, in a building, a back pressure is produced which also hinders the flow of the air through the apparatus. Rate of burning, venting and the introduction of the foam into the building are but a few of the factors which cause the back pressure to vary.

A propeller-type fan is designed so that at a given pressure condition, the amount of air propelled by each blade is evenly distributed along the length of the blade. However, the varying back pressure will, in the absence of a control device, affect the amount of air being drawn into the duct by the propeller-type fan. One characteristic of a propeller-type fan is that as the fan must deliver its rated air flow against a higher back pressure, a smaller portion of the total air flow will be delivered by those portions of the fan blades near the hub and a greater portion of the total air flow will be delivered by the tips of the blades. Consequently, as the back pressure varies during the course of the fire, the air flow pattern along each blade will vary. The varying flow pattern makes it very difficult to measure the total air flow. Thus, it is difficult to insure that the desired rate of air flow is maintained. Because of the varying air pattern, conventional air flow measuring devices, such as Pitot tubes, hot wire anemometers and the like cannot be used. These air flow measuring devices measure point conditions and therefore will not yield an accurate measure of the total air flow over a wide range of pressure conditions.

Accordingly, the primary objects of the present invention include:

To provide air flow control apparatus which provides an accurate measurement of the total air flow under a wide range of back pressure conditions;

To provide air flow control apparatus which insures a substantially constant rate of air flow despite varying back pressures which normally tend to vary the total air flow;

To provide air flow control apparatus for use with fire-fighting apparatus of the foam generating type; and To provide air flow control apparatus of simplified construction and improved operation.

In accordance with the present invention air flow control apparatus is provided for use with foam generating apparatus comprising a main duct having an inlet end and an outlet end. A propeller-type fan is positioned at the inlet end of the duct. A variable speed drive means serves to rotate the fan at the desired speed whereby air is drawn into the duct at a predetermined flow rate. The present air flow control apparatus maintains the flow rate of the air drawn into the duct substantially constant despite variations in back pressure which tend to change the flow rate. The present air flow control apparatus comprises, in general, a second fan positioned on the upstream side of the propeller-type fan and for rotation by the air drawn into the duct. The second fan will be rotated at a speed which is proportional to the amount of air drawn into the duct. If desired, baffle means may be provided to permit only air flowing perpendicularly to the propeller-type fan to impinge and drive the second fan. Generator means driven by the second fan serves to generate an electrical signal which is proportional to the speed of rotation of the second fan and, consequently, proportional to the amount of air drawn into the duct.

Where manual control of the air flow is desirable, a meter may be provided which is responsive to the generator signal. The meter will indicate the total air flow into the duct. In this instance, an operator of the foam generating apparatus will vary the speed of the drive to maintain the flow rate indicated by the meter within a predetermined range of the meter scale.

Where automatic control is feasible and desirable, suitable motor control means may be provided which is responsive to the generator signal and serves to automatically vary the speed of the drive means.

The above and other objects and advantages of the present invention will become apparent from the following detailed description by reference to the accompanying drawing, in which.

Figure 1:
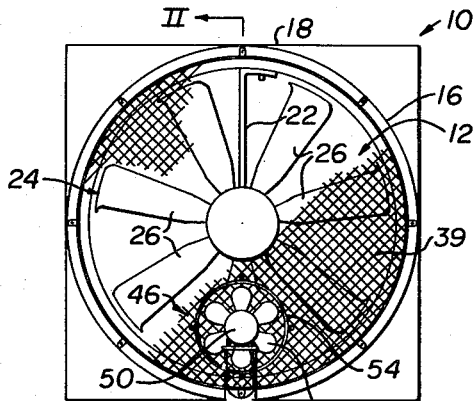
FIGURE 1 is a view of the inlet end of a main duct employed in a foam generating apparatus and provided with the air flow control apparatus of the present invention.

Referring now to the drawing, a main duct 10 is shown having an inlet end 12 and an outlet end 14. The main duct 10 is formed from a throat section 16 and a foaming section 18.

The throat section 16 is circular and has an outwardly expanding end portion 20 which defines the inlet end 12 of the main duct 10. Supported within the throat section 16 by means of a plurality of spider arms 22, is a propeller-type fan 24 having a plurality of blades 26 whose tips are disposed closely adjacent to the throat section 16. As illustrated, the propeller-type fan 24 may be driven by means of a variable speed motor 28 through a V-belt 30 engaged over a sheave 32 secured to the fan 24 and a sheave 34 secured to the motor 28. The motor 28 may comprise, for example, an internal combustion engine, an electric motor or the like.

Within the foaming section 18 there is supported an apertured member 36 preferably formed from a wettable material such as a net of loosely knit cotton yarn and the like. A plurality of spray nozzles 38 serve to wet the apertured member 36 by spraying a suitable aqueous foam producing solution. The air, flowing at a predetermined flow rate through the main duct 10, contacts the wetted apertured member 36 to generate the high-expansion foam. The foam generated will flow out through the outlet end 14 of the main duct 10 and through a suitable conduit (not shown) to the site of the fire. A screen 39 is positioned at the inlet end 12 adjacent to the propeller-type fan 24 and secured to the throat section 16. The screen 39 prevents the ingress of debris such as paper, twigs and the like.

As can be seen in FIG. 1, the distribution pattern of the air entering the inlet end 12 of the main duct 10 is comprised of a portion flowing perpendicularly to the propeller-type fan 24, indicated by the arrows 40 and an annular portion indicated by the arcuate arrows 42. The portion 42 is drawn into the inlet end 12 along a curved path.

Within the main duct 10, the air is flowing substantially parallel with the walls of the main duct 10 as indicated by the arrows 44. The air 44 will be substantially evenly distributed along the length of the blades 26 when the propeller-type fan 24 is acting against a predetermined back pressure. However, as stated above, during the course of a fire, the back pressure will vary. The effect of this varying back pressure on the distribution of the air 44 within the main duct 10 will be to upset the even distribution. That is to say, when the propeller-type fan 24 works to deliver the required amount of air against a higher back pressure, a greater amount of the air 44 will be delivered by the tips of the blades 26 and a lesser amount of the air 44 will be delivered by the heel portion of the blades 26. Because of the varying distribution of the air 44, conventional flow measuring devices such as a Pitot tube, a hot wire anemometer and the like, if used under these conditions, will yield an inaccurate measure of the total air flow through the main duct 10. This should be evident since these conventional air flow measuring devices measure a point condition which as has been shown will vary with a variation in the back pressure.

The present invention provides a suitable air flow measuring apparatus which may be used not only to measure the total air flow through the main duct 10 with a suitable accuracy but also may be used in conjunction with a motor control device for automatically varying the speed of the motor 28, the arrangement being such that the propeller-type fan 24 will be rotated continuously at speeds which will deliver the required amount of air to the apertured member 36.

As can be seen, an air flow measuring device 46 comprises a second fan 48 supported adjacent to the propeller-type fan 24 so that its plane of rotation is parallel to the plane of rotation of the propeller-type fan 24. The second fan 48 is supported by and drives a generator 50 which, in turn, is supported by a suitable mounting bracket 52 secured to the main duct 10.

Figure 2:
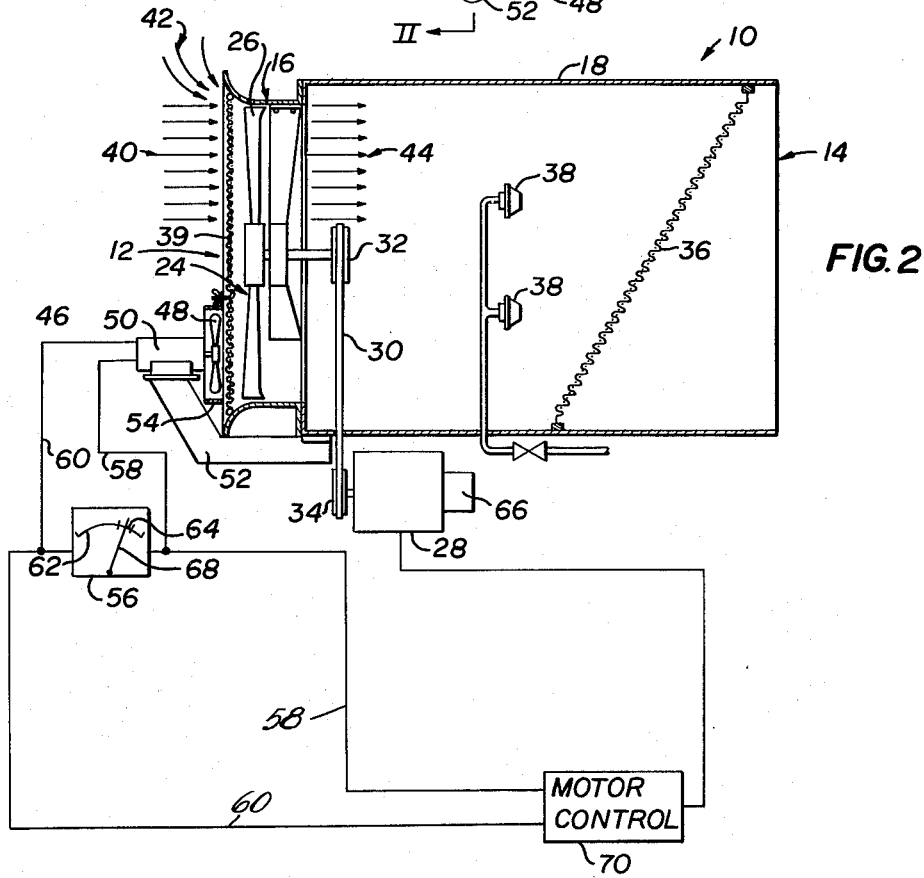
FIG. 2 is a cross-sectional view, taken along the line II—II of FIG. 1, illustrating manual control of the flow of air to the foam generating apparatus of FIG. 1 and schematically illustrating an automatic control system for controlling the air flow.

The second fan 48 has a diameter which preferably is less than one-half the diameter of the propeller-type fan 24. The second fan 48 preferably is positioned so that a portion of its periphery is adjacent to but spaced from the periphery of the propeller-type fan 24 as shown in FIG. 2. In this position, only the portion 40 of the air drawn into the duct 10 will drive the second fan 48. If desired, a baffle 54, secured to the screen 39, may be provided which preferably surrounds the second fan 48. It should be noted that the baffle 54 serves to exclude the portion 42, i.e., air drawn into the duct along an arcuate path, from impinging the second fan 48. The portion 42 of the air drawn into the duct if permitted to impinge on the second fan 48 would cause an inaccurate indication of the total air flow to the duct 10. Hence, although the baffle 54 is shown completely surrounding the second fan 48, all that is actually required is that the baffle 54 surround at least that portion of the second fan 48 in the region wherein the periphery of the second fan 48 is adjacent to the periphery of the propeller-type fan 24.

The positioning of the second fan 48 with respect to the blades 26 of the propeller-type fan 24 is such that during the passage of each of the blades 26, the second fan 48 will be subjected to a major portion of the total air drawn into the duct 10 by each of the blades 26. Thus, the second fan 48 measures an air flow across an area rather than at a point as in conventional air flow measuring devices. As described above, the flow pattern or distribution of the air portion 44 will vary as the back pressure in the main duct 10 varies. Corresponding variations in the air portion 40 flowing into the inlet end 12 also will occur. However, since measurement of the air flow (portion 40) by the second fan 48 is across an area, its speed of rotation still will be substantially proportional to the total air flow into the duct despite the variation in flow distribution of the air portion 40.

The generator 50 will generate a signal which also is proportional to the total air flow into the duct 10. The signal, which in this instance is in the form of an electric current, is carried to a meter 56 by conductor 58. The conductor 60 completes the circuit and leads from the meter 56 to the generator 50. The meter 56 can be calibrated so as to read directly in cubic feet per minute of air flow or in foam ratio. The meter 56 is provided with a scale 62 having a range 64 indicated thereon which range 64 is the desired rate of air flow for the foam generating apparatus with which the present air flow control apparatus is used. The operator merely views the meter 56 and manually varies the speed of the motor 28 by means of a speed control device schematically illustrated at 66, so as to maintain the pointer 68 of the meter 56 within the range 64. In this manner the required flow rate is maintained substantially constant during the operation of the foam generating apparatus.

Alternatively, the generator signal may be conducted to a suitable motor control device 70 by way of the conductors 58, 60. The motor control device 70 acts to vary the speed of the motor 28 in response to the signal from the generator 50.

When the back pressure within the duct 10 increases, there will be a decrease in the flow rate of air. The motor control device 70 will increase the speed of the motor 28 thereby increasing the speed of the propeller-type fan 24 to effect an increase in the flow rate into the duct 10 to the required value. When, however, the back pressure within the duct 10 falls, the flow rate into the duct 10 will increase above the required rate. At this time the motor control device 70 will decrease the speed of the motor 28 thereby decreasing the speed of the propeller-type fan 24 to effect a decrease in the flow rate into the duct 10 to the required value.

Although the present invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for forcing air through a duct at a predetermined flow rate, having a propeller-type fan positioned at an inlet of said duct and variable speed drive means for driving said propeller-type fan, said duct being subject to a back pressure on the downstream side of said propeller-type fan which varies and tends to change said flow rate, the improvement in means for maintaining the flow of said air at said predetermined flow rate, comprising: a second fan on the upstream side of said propeller-type fan and positioned for rotation by the air being drawn into said duct and at a speed proportional to the flow rate of air drawn into said duct; generator means driven by said second fan for generating a signal proportional to the speed of rotation of said second fan; and drive control means for varying the speed of said drive means in response to said signal whereby the flow of air is maintained at said predetermined flow rate.

2. An apparatus for forcing air through a duct at a predetermined flow rate, having a propeller-type fan positioned in an inlet of said duct and variable speed drive means for driving said propeller-type fan, said duct being subject to a back pressure on the downstream side of said propeller-type fan which tends to change said flow rate, the improvement in means for maintaining said flow rate substantially constant, comprising: a second fan having a diameter which is smaller than the diameter of said propeller-type fan, said second fan being positioned on the upstream side of said propeller-type fan and for rotation by the air being drawn into said duct and at a speed proportional to the flow rate of said air; generator means driven by said second fan for generating a signal proportional to the speed of rotation of said second fan; and drive control means coupled with said variable speed drive means and said generator means for varying the speed of said drive means in response to said signal whereby the flow of air is maintained at said predetermined flow rate.

3. The improvement of claim 1 including means for indicating the rate of flow into said duct.

4. In apparatus for forcing air through a duct at a predetermined flow rate, having a propeller-type fan positioned in an inlet end of said duct and variable speed drive means for driving said propeller-type fan, said duct being subject to a back pressure on the downstream side of said propeller-type fan which varies and tends to change said flow rate of said air, the improvement in means for maintaining said flow rate substantially constant, comprising: a second fan having a diameter which is less than half of the diameter of said propeller-type fan, said second fan being positioned adjacent to the periphery of said propeller-type fan and for rotation by the air being drawn into said duct, said second fan being rotated at a speed proportional to the rate of air flow into said duct; generator means driven by said second fan for generating a signal which is proportional to the rate of flow of the air into said duct; and drive control means coupled with said variable speed drive means and said generator means for varying the speed of said drive means in response to said signal whereby the flow of air is maintained at said predetermined flow rate.

5. The improvement of claim 4 including a baffle plate interposed between the adjacent peripheries of said propeller-type fan and said second fan, said baffle plate extending around at least portion of the periphery of said second fan.

6. In fire-fighting apparatus which generates a high-expansion foam by forced movement of air at a predetermined flow rate through an apertured member wetted by a foam producing solution, said apparatus having a duct including an inlet end and a discharge end and in which said apertured member is positioned, a propeller-type fan positioned at said inlet end, a variable speed drive means for driving said propeller-type fan, said duct being subject to a back pressure created by the fire being fought which varies and tends to change the rate of flow of said air, the improvement in means for maintaining the flow of said air at said predetermined flow rate comprising: a second fan on the upstream side of said propeller-type fan and positioned for rotation by the air being drawn into said duct and at a speed which is proportional to the flow rate of the air being drawn into said duct; generator means driven by said second fan for generating a signal which is proportional to the speed of rotation of said second fan; and drive control means coupled to said drive means and said generator means for varying the speed of said drive means in response to said signal whereby the flow of air into said duct is maintained at said predetermined flow rate.

References Cited by the Examiner
UNITED STATES PATENTS

| | | | |
|---|---|---|---|
| 755,199 | 3/1904 | Wellman | 230—274 |
| 1,436,575 | 11/1922 | Colt. | |
| 2,467,582 | 4/1949 | Corkran. | |
| 3,065,797 | 11/1962 | Barnes | 169—15 |
| 3,068,891 | 12/1962 | Panning et al. | 137—499 |

EVERETT W. KIRBY, *Primary Examiner.*